(12) United States Patent
Aoki

(10) Patent No.: US 7,424,188 B2
(45) Date of Patent: Sep. 9, 2008

(54) OPTICAL MODULE AND MOUNTING DEVIATION COMPENSATION METHOD FOR OPTICAL WAVEGUIDE PART

(75) Inventor: Shigenori Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/259,145

(22) Filed: Oct. 27, 2005

(65) Prior Publication Data

US 2007/0014519 A1 Jan. 18, 2007

(30) Foreign Application Priority Data

Jul. 14, 2005 (JP) ............... 2005-205775

(51) Int. Cl.
*G02B 6/26* (2006.01)
(52) U.S. Cl. .......................... 385/40; 385/50
(58) Field of Classification Search ................ None
See application file for complete search history.

(56) References Cited

U.S. PATENT DOCUMENTS

| 6,842,573 B2 * | 1/2005 | Birnbach ................ 385/50 |
| 6,917,748 B2 * | 7/2005 | Glebov et al. ............. 385/140 |
| 2005/0111792 A1 * | 5/2005 | Levner et al. ............. 385/37 |

FOREIGN PATENT DOCUMENTS

| JP | 3-256030 | 11/1991 |
| JP | 2002-23205 | 1/2002 |

OTHER PUBLICATIONS

David W. Vernooy, et al.; "Alignment-insensitive coupling for PLC-based surface mount photonics", IEEE Photonics Technology Letters, vol. 16, No. 1, pp. 269-271.
I. Liakatas et al., "Importance of Intermolecular interactions in the nonlinear optical properties of poled polymers", applied physics letters, vol. 76, No. 11, pp. 1368-1370.

* cited by examiner

*Primary Examiner*—Tina M Wong
(74) *Attorney, Agent, or Firm*—Westerman, Hattori, Daniels & Adrian, LLP.

(57) ABSTRACT

The optical module includes a first optical waveguide part including a first waveguide core, a second optical waveguide part including a second waveguide core and provided such that the second waveguide core and the first waveguide core are positioned partially close to each other so that a light propagating in one of the first and second waveguide cores can be coupled to the other of the first and second waveguide cores, an electro-optic material layer provided between the first and second waveguide cores and formed from an electro-optic material, and an electrode for applying an electric field to the electro-optic material layer so that the refractive index of the electro-optic material layer varies and the optical coupling coefficient between the first and second waveguide cores varies.

19 Claims, 6 Drawing Sheets

OPTICAL MODULE AND MOUNTING DEVIATION COMPENSATION METHOD FOR OPTICAL WAVEGUIDE PART

CROSS REFERENCE TO RELATED APPLICATIONS

This application is based on and hereby claims priority to Japanese Application No. 2005-205775 filed on filed on Jul. 14, 2005 in Japan, the contents of which are hereby incorporated by reference.

BACKGROUND OF THE INVENTION

1) Field of the Invention

The present invention relates to an optical module produced by assembling a plurality of optical waveguide parts (for example, optical wave transmitting parts) used, for example, for optical communication and a mounting deviation compensation method for an optical waveguide part.

2) Description of the Related Art

In recent years, attention is paid to a mounting technique (optical integration technique) for hybrid integrating optical parts on an Si platform or a PLC (Planar Lightwave Circuit) platform as a technique suitable for satisfaction of a demand for mass production and reduction in cost of an optical module.

Further, a mounting technique (planar mounting technique) which uses a PLC platform as a mounting substrate is considered suitable for downsizing of an optical module and simplification of an assembly process because optical parts are carried on a common substrate on the surface of which a waveguide is formed.

Where an optical part (optical waveguide device) is mounted on a platform (optical waveguide substrate), it is common to perform an aligning operation using an active alignment technique for adjusting the position of an optical part while monitoring the actual optical coupling efficiency.

Further, where an optical device (optical waveguide device) is of a type wherein a light beam propagates along the surface of the device and goes out from an end face of the device or of another type wherein a light beam incoming from an end face of the device propagates along the surface of the device and goes out from another end face of the device such as, for example, an optical modulator formed using lithium niobate (LN), a Fabry-Perot type semiconductor laser or the like is commonly coupled to a linearly disposed optical fiber or optical waveguide through a lens provided in the proximity of the end face of the device.

It is to be noted that, through a prior art search conducted, Japanese Patent Laid-Open No. 2002-23205, Japanese Patent Laid-Open No. Hei 3-256030, and David W. Vernooy, "Alignment-Insensitive Coupling for PLC-Based Surface Mount Photonics", IEEE PHOTONICS TECHNOLOGY LETTERS, Vol. 16, No. 1, pp.269-271, JANUARY 2004 (hereinafter referred to as David) were found.

Japanese Patent Laid-Open No. 2002-23205 discloses an optical device wherein a voltage is applied to a cladding layer formed between two optical waveguides in a semiconductor optical waveguide to vary the refractive index of the cladding layer to vary the coupling length so that a wavelength of light to be extracted can be selected (for example, refer to the second embodiment).

However, in the optical device disclosed in Japanese Patent Laid-Open No. 2002-23205, only the coupling length between the optical waveguides disposed in accuracy and formed integrally by a semiconductor process is varied so that the wavelength of light to be extracted can be selected, but a plurality of optical waveguide parts are not involved. Particularly, in the optical device disclosed in Japanese Patent Laid-Open No. 2002-23205, such a subject as of the present invention that "the variation of the physical distance between waveguide cores which appears upon assembling can be compensated for and a sufficient optical coupling efficiency can be obtained" is not supposed at all.

Japanese Patent Laid-Open No. Hei 3-256030 discloses an optical device wherein, where an outgoing angle (emitting angle) is varied by a temperature variation or the like, an electric field is applied to an optical waveguide having an electro-optic effect to vary the refractive index so that the optical axis of outgoing light (emitting light) can be maintained fixedly (refer to, for example, descriptions in "Subject to Be Solved by the Invention", "Means for Solving the Subject" and "Operation" of the specification).

However, Japanese Patent Laid-Open No. Hei 3-256030 only discloses the optical device wherein an electric field is applied to an optical waveguide having an electro-optic effect to vary the refractive index of the optical waveguide so that the optical axis of outgoing light can be maintained fixedly, but does not disclose provision of a plurality of optical waveguide parts. Particularly, such a subject as of the present invention that "the variation of the physical distance between waveguide cores which appears upon assembling can be compensated for and a sufficient optical coupling efficiency can be obtained" is not supposed at all.

David discloses a method wherein, where an optical waveguide device is mounted on an optical waveguide substrate, individual optical waveguides of the optical waveguide device and the optical waveguide substrate are disposed closely and in parallel to each other so that evanescent components of optical waves are coupled to each other.

SUMMARY OF THE INVENTION

Incidentally, where an optical waveguide device is mounted on an optical waveguide substrate in such a manner as described above, much time and labor are required for an aligning operation. Further, it is difficult to couple lights to each other with a high degree of efficiency.

Further, where an optical waveguide device is coupled to an optical fiber or the like, downsizing and integration are difficult. Furthermore, since reflection loss occurs at the lens surface or the end face of the optical waveguide, it is difficult to couple lights to each other with a high degree of efficiency.

In this regard, David has proposed a method wherein, where an optical waveguide device is mounted on an optical waveguide substrate in order to obtain a high optical coupling efficiency, optical waveguides of the optical waveguide device and the optical waveguide substrate are disposed closely and in parallel to each other so that evanescent components of light waves are coupled to each other. However, since coupling of evanescent components of light waves is very sensitive to the distance between the optical waveguides and also to the length of close parallel portions of the optical waveguides, very high mounting accuracy is demanded.

Theoretically, an optical coupling efficiency of substantially 100% is obtained, for example, if two waveguide cores are disposed closely to each other so as to achieve optical coupling between the two waveguide cores such that, where the refractive index n of the two waveguide cores A and B is 1.567 and the sectional size of the waveguide cores A and B is 7 μm by 7 μm while the refractive index of a clad formed between the two waveguide cores A and B is 1.563 and the length (coupling length) of parallel portions of the two waveguide cores A and B which are disposed closely to each other is 3 mm as seen in FIG. 6, the distance between the waveguide cores A and B (magnitude of the gap between the waveguide cores; distance between edges of the waveguide cores) is set to 5.5 µm.

However, even if the magnitude of the gap between the waveguide cores is designed to 5.5 µm, actually there is the possibility that some variation may appear and make the thicknesses of the waveguide cores different from each other. For example, if the magnitude of the gap between the waveguide cores decreases to approximately 4.0 µm, then the optical coupling efficiency suddenly decreases to approximately 53%.

Generally, in an assembling process, it is not easy to suppress the positional displacement to approximately 1 µm or less. Therefore, in order to cope with such a great variation of the optical coupling efficiency as just described, it is necessary to design an optical module so that it has a large margin.

It is an object of the present invention to provide an optical module by which a sufficiently high optical coupling efficiency can be obtained even if a variation (mounting deviation) of the distance between waveguide cores appears upon assembling of a plurality of optical waveguide parts.

It is another object of the present invention to provide a mounting deviation compensation method for an optical waveguide part which compensates for a drop of the optical coupling efficiency which arises from a variation (mounting deviation) of the distance between waveguide cores which appears upon assembling of a plurality of optical waveguide parts.

In order to attain the objects described above, according to an aspect of the present invention, there is provided an optical module comprising a first optical waveguide part including a first waveguide core, a second optical waveguide part including a second waveguide core and provided such that the second waveguide core and the first waveguide core are positioned partially close to each other so that a light propagating in one of the first and second waveguide cores can be coupled to the other of the first and second waveguide cores, an electro-optic material layer provided between the first and second waveguide cores and formed from an electro-optic material, and an electrode for applying an electric field to the electro-optic material layer so that the refractive index of the electro-optic material layer varies and the optical coupling coefficient between the first and second waveguide cores varies.

With the optical module, the refractive index of the electro-optic material layer can be varied to vary the optical coupling coefficient between the first and second waveguide cores by applying an electric field to the electro-optic material layer through the electrode. Consequently, the optical module is advantageous in that, even if a variation (mounting deviation) of the distance between the waveguide cores appears upon assembling of a plurality of waveguide parts, a sufficient optical coupling efficiency can be achieved.

According to another aspect of the present invention, there is provided a mounting deviation compensation method for an optical waveguide part, comprising the steps of preparing a first optical waveguide part including a first waveguide core and a second optical waveguide part including a second waveguide core, assembling the first and second optical waveguide parts with an electro-optic material layer interposed therebetween such that the first and second waveguide cores are positioned partially close to each other so that a light propagating in one of the first and second waveguide cores can be coupled to the other of the first and second waveguide cores, and applying, where the distance between the first and second waveguide cores deviates, an electric field to the electro-optic material layer to change the refraction index of the electro-optic material layer thereby to change the optical coupling coefficient between the first and second waveguide cores.

With the mounting deviation compensation method for an optical waveguide part, a drop of the optical coupling efficiency arising from a variation (mounting deviation) of the distance between the waveguide cores which appears upon assembling of a plurality of waveguide parts can be compensated for. Consequently, the mounting deviation compensation method for an optical waveguide part is advantageous in that a sufficient optical coupling efficiency can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

In the following, an optical module and a mounting deviation compensation method for an optical waveguide part according to an embodiment of the present invention are described with reference to FIG. 1 to 5.

Figure 1:
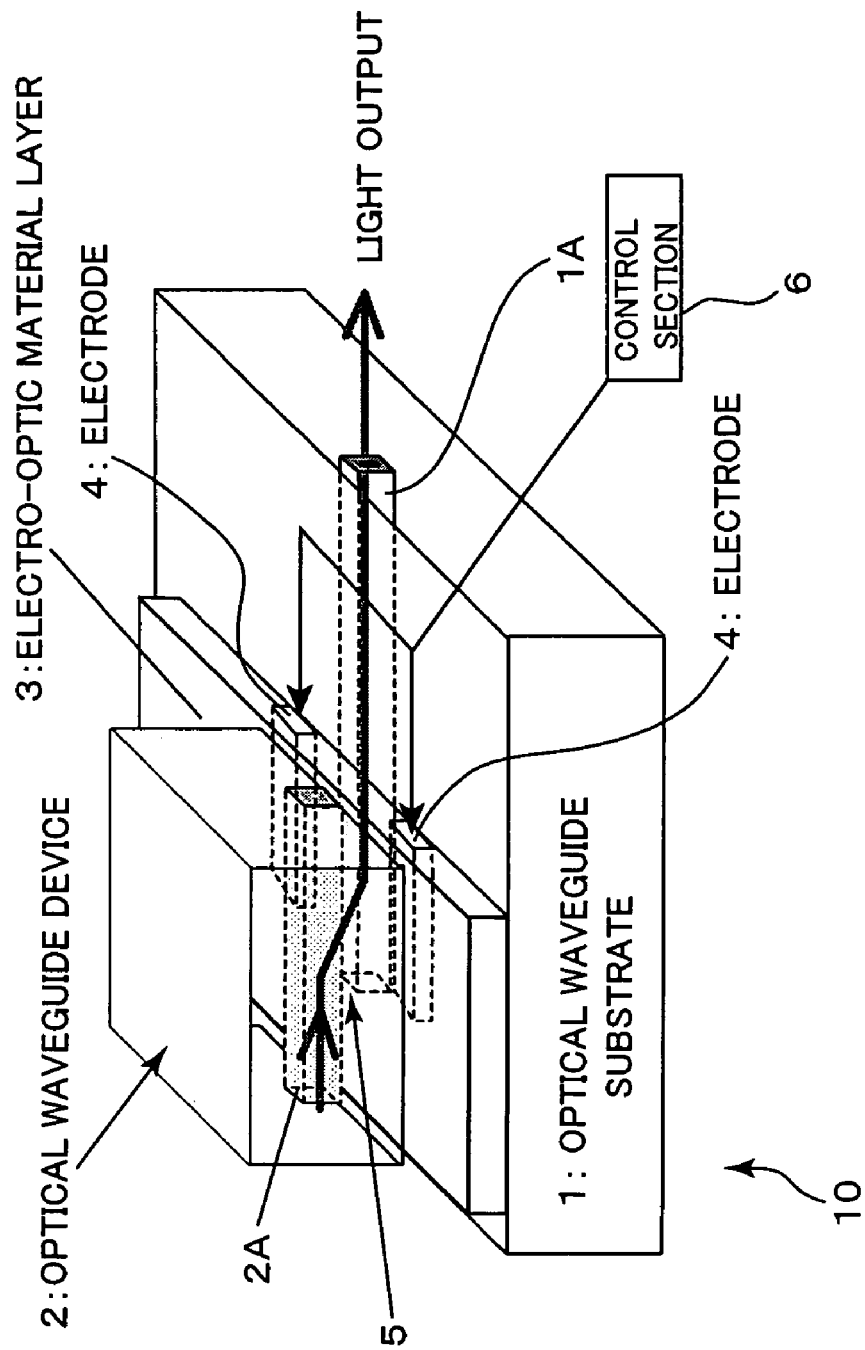
FIG. 1 is a schematic perspective view showing a configuration of an optical module and illustrating a mounting deviation compensation method for an optical waveguide part according to an embodiment of the present invention.

Referring first to FIG. 1, the optical module according to the present embodiment includes an optical waveguide substrate (optical waveguide part) 1 to the surface of which a waveguide core (substrate side waveguide core) 1A is exposed, an optical waveguide device (optical waveguide part) 2 to the surface of which a waveguide core (device side waveguide core) 2A is exposed, an electro-optic material layer 3 made of an electro-optic material and provided between the substrate side waveguide core 1A and the device side waveguide core 2A, and a pair of electrodes 4 for applying an electric field to the electro-optic material layer 3.

In particular, the present optical module 10 is configured such that the face of the optical waveguide substrate 1 to which the waveguide core 1A is exposed and the face of the optical waveguide device 2 to which the waveguide core 2A is exposed are opposed and secured to each other by adhesive (which later makes the electro-optic material layer 3) made of an electro-optic material to mount the optical waveguide device 2 on the optical waveguide substrate 1 with the electro-optic material layer 3 interposed therebetween.

Then, an electric field can be applied to the electro-optic material layer 3 through the electrodes 4 to vary the refractive index of the electro-optic material layer 3 thereby to vary the optical coupling coefficient between the substrate side waveguide core 1A or the device side waveguide core 2A.

Here, the optical waveguide substrate 1 and the optical waveguide device 2 are optical waveguide parts independent of each other, and the substrate side waveguide core 1A or the device side waveguide core 2A are provided in a state wherein they are partially positioned closely and in parallel to each other such that lights propagating the substrate side waveguide core 1A or the device side waveguide core 2A can be coupled between the substrate side waveguide core 1A and the device side waveguide core 2A. In particular, the substrate side waveguide core 1A and the device side waveguide core 2A have parallel portions (close parallel portion) at which they are positioned closely to each other, and the parallel portion functions as an optical coupler 5.

Here, the optical waveguide substrate 1 is a substrate on which the channel-shaped waveguide core 1A is formed such that, for example, a light beam incoming from an end face thereof propagates along the surface thereof and goes out from the other end face thereof. The optical waveguide substrate 1 is, for example, a PLC (Planar Lightwave Circuit) platform or an Si platform.

The optical waveguide device 2 is a device on which the channel-shaped waveguide core 2A is formed such that, for example, a light beam propagates along the surface thereof and goes out or comes in from an end face thereof. The optical waveguide device 2 is an optical waveguide device (for example, a semiconductor laser and so forth) for allowing a light beam to propagate along the surface thereof and go out from an end face thereof or an optical waveguide device (for example, an optical modulator and so forth) for allowing a light beam incoming from an end face thereof to propagate along the surface thereof and go out from an end face thereof.

Only it is necessary for the electro-optic material layer 3 to be formed from a material which can generate an electro-optic effect, and although particularly there is no limitation, the electro-optic material layer 3 can be formed from, for example, a polymer material (especially a polymer material which contains a dye). As the polymer material (electro-optic polymer material) which can generate an electro-optic effect, for example, a material formed by dispersing Disperse Red-1 or CLD-1 which is a kind of chromophore into polymethyl methacrylate, polycarbonate, epoxy or the like can be used (refer to, for example, I. Liakatas et al., "Importance of intermolecular interactions in the nonlinear optical properties of poled polymers", APPLIED PHYSICS LETTERS, VOLUME 76, NUMBER 11, 13, MARCH 2000, p.1368).

It is to be noted that, as the electro-optic material, not only the electro-optic polymer mentioned above but also perovskite type (related) crystal materials such as lithium niobate ($LiNbO_3$), lead lanthanum zirconate titanate (PLZT), barium titanate ($BaTiO_3$) and so forth and also semiconductor materials such as, for example, GaAs and so forth can be used.

In the present embodiment, the optical waveguide parts 1 and 2 to the surface of which the waveguide cores 1A and 2A are exposed, respectively, are adhered to each other with the electro-optic material layer 3 interposed therebetween. Therefore, the electro-optic material layer 3 can function as a cladding layer. It is to be noted that, although, in FIG. 1, the electro-optic material layer 3 is shown partially in order to facilitate the illustration, actually the electro-optic material layer 3 is formed on the entire face of the optical waveguide substrate 1 so as to cover the surface of the optical waveguide substrate The electrodes 4 are provided, for example, on the opposite sides of the waveguide core 1A which forms the optical waveguide substrate 1 such that the waveguide core 1A is sandwiched by the electrodes 4. It is to be noted here that, while the electrodes 4 are provided on the optical waveguide substrate 1 side, the disposition of the electrodes 4 is not limited to this, and the electrodes 4 may be provided otherwise on the optical waveguide device 2 side. In other words, the electrodes 4 maybe provided, for example, on the opposite sides of the waveguide core 2A which forms the optical waveguide device 2 such that the waveguide core 2A is sandwiched by the electrodes 4.

Further, in the present embodiment, a control section (controller) 6 is connected to the electrodes 4 so that the voltage to be applied to the electrodes 4 is controlled based on the distance between the substrate side waveguide core 1A and the device side waveguide core 2A (to the magnitude of the gap between the waveguide cores) by the control section 6. If the voltage to be applied to the electrodes 4 is controlled in such a manner as just described, the electric field to be applied to the electro-optic material layer 3 varies to vary the refractive index of the electro-optic material layer 3. Consequently, the optical coupling coefficient between the substrate side waveguide core 1A and the device side waveguide core 2A varies.

Accordingly, with the optical module according to the present embodiment, the refractive index of the electro-optic material layer 3 can be varied to vary the optical coupling coefficient between the substrate side waveguide core 1A and the device side waveguide core 2A by applying the electric field to the electro-optic material layer 3 through the electrodes 4. Therefore, there is an advantage that, even if a variation (mounting variation) of the physical distance between the waveguide cores 1A and 2A appears when a plurality of optical waveguide parts 1 and 2 are to be assembled, the variation can be compensated for (corrected, absorbed) and a sufficient optical coupling efficiency can be obtained. Consequently, the optical module 10 need not be designed with a great margin applied to the optical coupling efficiency, and a mounting method having a high cost performance can be implemented.

In particular, even if the physical distance between the waveguide cores 1A and 2A (magnitude of the gap between the waveguide cores; distance between edges of the waveguide cores) at the close parallel portion (optical connection section) 5 at which the waveguide core 1A formed on the optical waveguide substrate 1 and the waveguide core 2A formed on the optical waveguide device 2 are positioned closely to each other deviates when the optical waveguide device 2 is to be mounted on the optical waveguide substrate 1 with the electro-optic material layer 3 interposed therebetween, if the optical waveguide coupling technique is used to vary the optical coupling coefficient between the substrate side waveguide core 1A and the device side waveguide core 2A, then the mounting deviation can be eliminated and the substantial distance between the waveguide cores can be adjusted, and a sufficiently high optical coupling efficiency can be obtained.

Therefore, a mounting deviation compensation method for an optical waveguide part according to the present embodiment is configured as described below.

In particular, the optical waveguide substrate (optical waveguide part) 1 including the substrate side waveguide core 1A and the optical waveguide device (optical waveguide part) 2 including the device side waveguide core 2A are prepared first. Here, the optical waveguide substrate 1 to the surface of which the waveguide core 1A is exposed and the optical waveguide device 2 to the surface of which the waveguide core 2A is exposed are prepared.

Then, the optical waveguide substrate 1 and the optical waveguide device 2 are assembled to each other with the electro-optic material layer 3 interposed therebetween such that the substrate side waveguide core 1A and the device side waveguide core 2A are positioned partially closely so that lights propagating therein can be coupled between the substrate side waveguide core 1A and the device side waveguide core 2A. In the present embodiment, the optical waveguide device 2 is mounted on the optical waveguide substrate 1 with the electro-optic material layer 3 interposed therebetween.

Then, if the distance between the substrate side waveguide core 1A and the device side waveguide core 2A deviates, then an electric field is applied to the electro-optic material layer 3 to vary the refractive index of the electro-optic material layer 3 to vary the optical coupling coefficient between the substrate side waveguide core 1A and the device side waveguide core 2A.

Accordingly, with the mounting deviation compensation method for an optical waveguide part of the present embodiment, there is an advantage that a drop of the optical coupling efficiency arising from a variation (mounting deviation) of the physical distance (coupling distance) between the waveguide cores 1A and 2A which appears upon assembling of a plurality of optical waveguide parts 1 and 2 can be compensated for and a sufficiently high optical coupling efficiency can be obtained achieved.

Incidentally, when the optical waveguide device 2 is mounted on the optical waveguide substrate 1, the distance between the waveguide cores 1A and 2A may deviate in the following two manners. In the first case, the positions of the two waveguide cores 1A and 2A are displaced from each other in a horizontal direction as seen from FIG. 2(B) [which corresponds to an X-Y section and a Z-Y section of FIG. 1]. In the second case, the positions of the two waveguide cores 1A and 2A are displaced from each other in a vertical direction as seen in FIG. 2 (C) [which corresponds to the X-Y section and a Z-Y section of FIG. 1] [in other words, a case wherein the thickness of a layer interposed between the two waveguide cores 1A and 2A (such as, for example, a cladding layer or an adhesive layer) is displaced from its designed value].

In any of such cases as described above, if an electric field is applied to the electro-optic material layer 3 through the electrode 4 to vary the refractive index of the electro-optic material layer 3 to vary the optical coupling coefficient between the waveguide cores 1A and 2A as described above, then the variation of the physical distance between the waveguide cores 1A and 2A which appears when a plurality of optical waveguide parts 1 and 2 are assembled can be compensated for (corrected, absorbed), and a sufficient optical coupling efficiency can be obtained.

Figure 2:
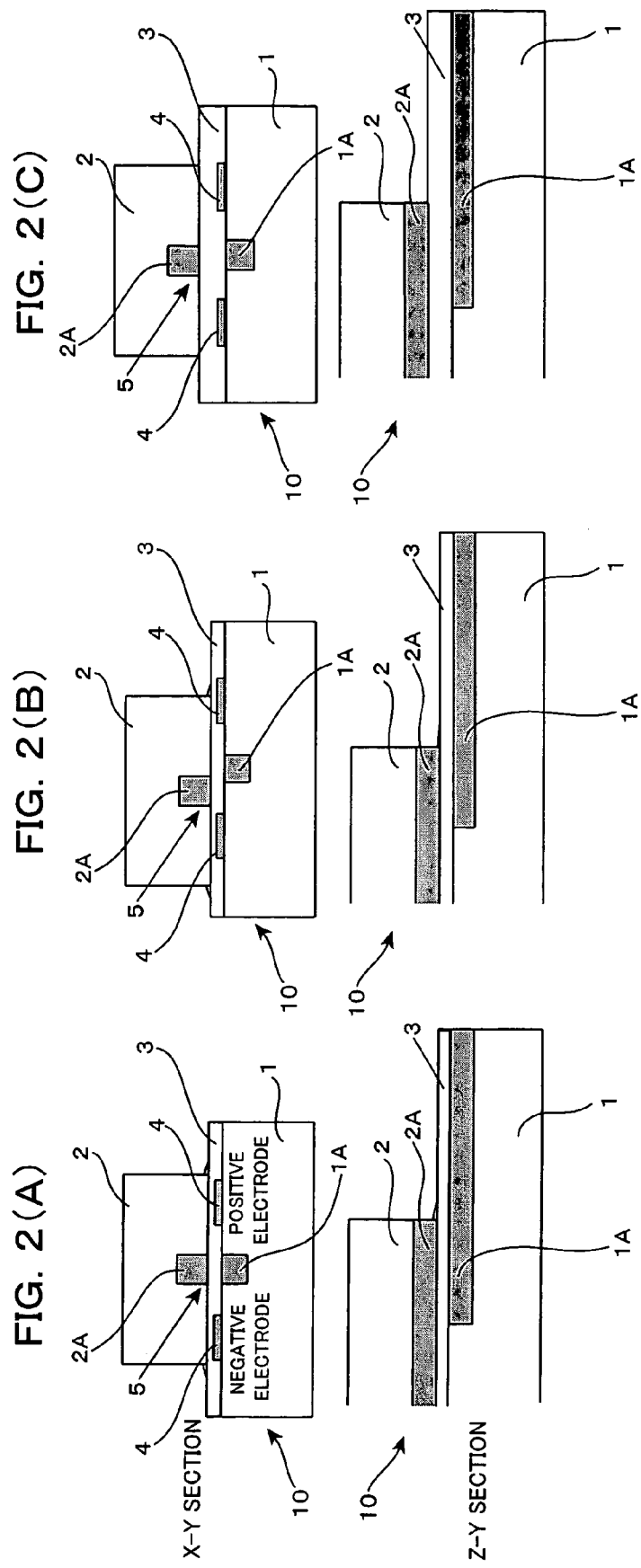
FIGS. 2(A) to 2(C) are schematic sectional views showing the optical module of the embodiment of the present invention particularly in a case wherein there is no mounting deviation, another case wherein mounting deviation appears in a horizontal direction, and a further case wherein a mounting deviation appears in a vertical direction, respectively.

It is to be noted that, as shown in FIG. 2 (A) [which corresponds to the X-Y section and the Z-Y section of FIG. 1], where a mounting deviation does not appear, there is no necessity to apply an electric field to the electro-optic material layer 3 through the electrode 4.

Figure 3:
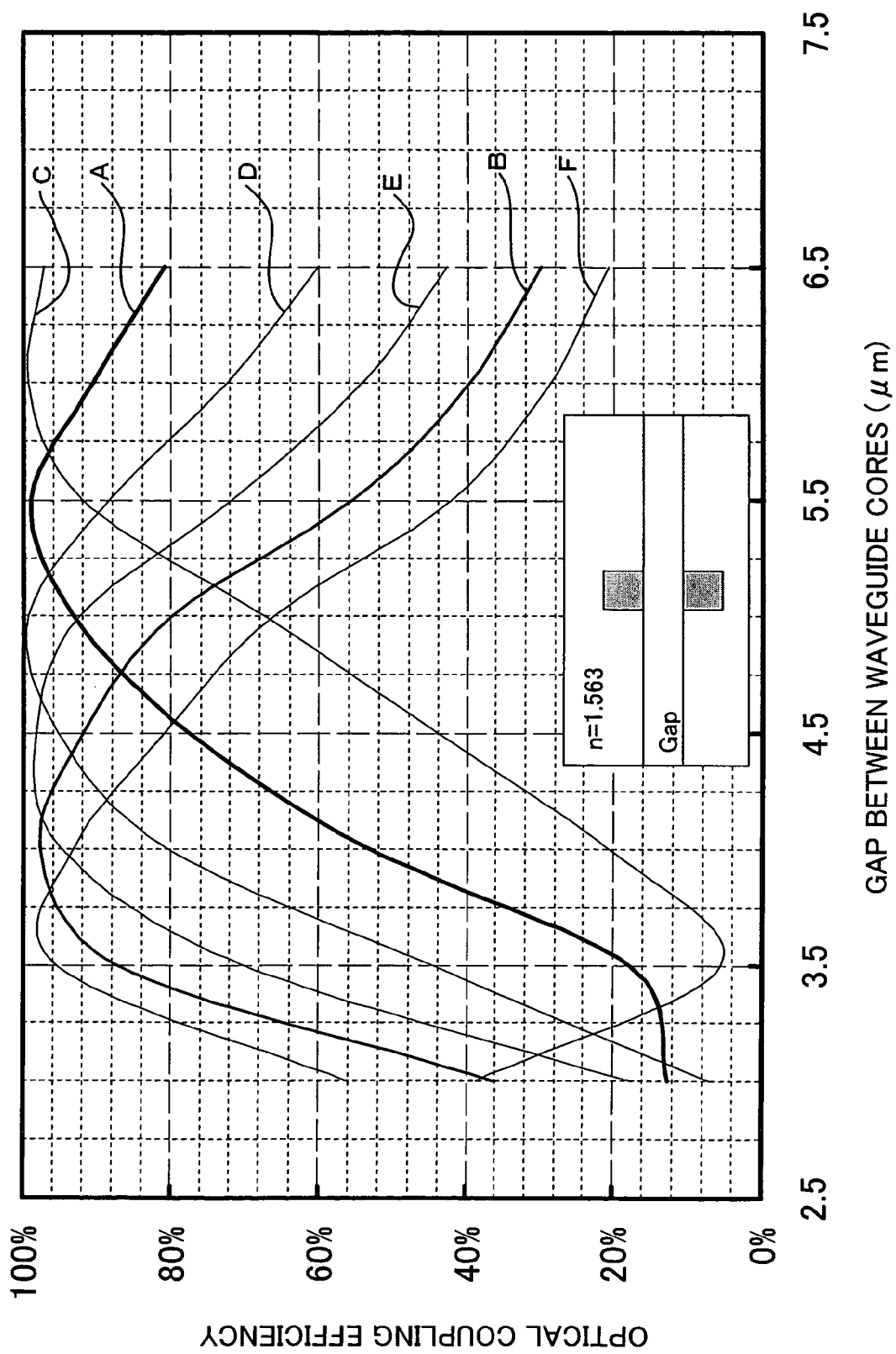
FIG. 3 is a graph illustrating a relationship between the magnitude of the gap between waveguide cores and the optical coupling efficiency of the optical module according to the embodiment of the present invention.

For example, where the optical waveguide device 2 is adhered to the optical waveguide substrate 1 using adhesive (which later makes the electro-optic material layer 3) made of an electro-optic material whose refractive index n is 1.563, the optical coupling efficiency between the waveguide cores 1A and 2A varies based on the distance between the waveguide cores 1A and 2A (magnitude of the gap between the waveguide cores; distance between the edges of the waveguide cores) as indicated by a solid line A in FIG. 3. It is to be noted that the coupling length (length of the adjacent parallel portion 5) here is 3 mm. Further, the refractive index of each of the waveguide cores 1A and 2A is 1.567 and the sectional size of each of the waveguide cores 1A and 2A is 7 μm by 7 μm.

Where the refractive index n of the electro-optic material layer 3 is 1.563, if the magnitude of the gap between the waveguide cores (distance between the waveguide cores 1A and 2A) is set to 5.5 μm as seen from the solid line A of FIG. 3, then an optical coupling efficiency of substantially 100% can be obtained.

However, even if the optical module is designed such that the magnitude of the gap between the waveguide cores 1A and 2A is set to 5.5 μm, actually there is the possibility that a variation may appear and make the thicknesses of the waveguide cores 1A and 2A different from each other. For example, where the magnitude of the gap between the waveguide cores is approximately 4.0 μm, the optical coupling efficiency suddenly decreases to approximately 5% as seen from the solid line A of FIG. 3.

In this instance, if an electric field is applied to the electro-optic material layer 3 through the electrode 4 to vary the refractive index of the electro-optic material layer 3 (here, to decrease the refractive index n to 1.5615) to vary the optical coupling coefficient between the waveguide cores 1A and 2A, then an optical coupling efficiency of substantially 100% can be obtained as seen from a solid line B of FIG. 3.

Similarly, where the magnitude of the gap between the waveguide cores is set to approximately 6.0 μm, if the refractive index n of the electro-optic material layer 3 is increased to 1.5635 to vary the optical coupling coefficient between the waveguide cores 1A and 2A, then an optical coupling efficiency of substantially 100% can be obtained as seen from a solid line C of FIG. 3.

Further, where the magnitude of the gap between the waveguide cores changes to approximately 4.8 μm, if the refractive index n of the electro-optic material layer 3 is decreased to 1.5625 to vary the optical coupling coefficient between the waveguide cores 1A and 2A, then an optical coupling efficiency of substantially 100% can be obtained as seen from a solid line D of FIG. 3.

Furthermore, where the magnitude of the gap between the waveguide cores further changes to approximately 4.3 μm, if the refractive index n of the electro-optic material layer 3 is decreased to 1.5620 to vary the optical coupling coefficient between the waveguide cores 1A and 2A, then an optical coupling efficiency of substantially 100% can be obtained as seen from a solid line E of FIG. 3.

Still further, where the magnitude of the gap between the waveguide cores further decreases to approximately 3.7 μm, if the refractive index n of the electro-optic material layer 3 is decreased to 1.5610 to vary the optical coupling coefficient between the waveguide cores 1A and 2A, then an optical coupling efficiency of substantially 100% can be obtained as seen from a solid line F of FIG. 3.

In summary, where the magnitude of the gap between the waveguide cores is great, if the refractive index of the electro-optic material layer 3 is increased based on the magnitude (in this instance, the characteristic curve of the optical coupling efficiency continuously moves to the right side in FIG. 3), then an optical coupling efficiency of substantially 100% can be obtained. On the other hand, where the magnitude of the gap between the waveguide cores is small, if the refractive index of the electro-optic material layer 3 is decreased based on the magnitude (in this instance, the characteristic curve of the optical coupling efficiency continuously moves to the left side in FIG. 3), then an optical coupling efficiency of substantially 100% can be obtained.

In this manner, where the distance between the waveguide cores 1A and 2A (magnitude of the gap between the waveguide cores; distance between the edges of the waveguide cores) deviates when the optical waveguide device 2 is mounted on the optical waveguide substrate 1, if an electric field is applied to the electro-optic material layer 3 through the electrode 4 to vary the refractive index of the electro-optic material layer 3 to vary the optical coupling coefficient between the waveguide cores 1A and 2A so that the characteristic curve indicating a relationship between the optical coupling efficiency and the distance between the waveguide cores (characteristic curve of an optical coupling efficiency) becomes equal to one of the curves indicated by solid lines in FIG. 3, then an optical coupling efficiency of substantially 100% can be obtained.

It is to be noted that, in the optical module according to the present embodiment, while one of two optical waveguide parts is formed as the optical waveguide substrate 1 to the surface of which the waveguide core 1A is exposed and the other optical waveguide part is formed as the optical waveguide device 2 to the surface of which the waveguide core 2A is exposed and the optical waveguide device is mounted on the optical waveguide substrate with the electro-optic material layer interposed therebetween, the configuration of the optical module according to the present invention is not limited to this.

For example, the optical module may be formed such that one of two optical waveguide parts is formed as an optical waveguide substrate on a waveguide core (substrate side waveguide core) of which an upper cladding layer as an electro-optic material layer is provided and the other optical waveguide part is formed as an optical waveguide device to the surface of which a waveguide core (device side waveguide core) is exposed and the optical waveguide device is mounted on the optical waveguide substrate.

Alternatively, the optical module maybe formed such that one of two optical waveguide parts is formed as an optical waveguide device on a waveguide core (substrate side waveguide core) of which an upper cladding layer as an electro-optic material layer is provided and the other optical waveguide part is formed as an optical waveguide substrate to the surface of which a waveguide core (device side waveguide core) is exposed and the optical waveguide device is mounted on the optical waveguide substrate.

Where the optical module is configured in such a manner as just described, the cladding layer as an electro-optic material layer is provided between the substrate side waveguide core and the device side waveguide core. It is to be noted that, in this instance, the electro-optic material layer functions as the cladding layer and can be made of a material which can be processed precisely such that it is exposed to the surface of the optical waveguide device or the optical waveguide substrate. Further, the waveguide core is not exposed to the surface of the optical waveguide part including the cladding layer as the electro-optic material layer, but is formed in the proximity of the surface.

Further, while, in the mounting deviation compensation method for an optical waveguide part according to the embodiment described above, the optical waveguide device 2 to the surface of which the waveguide core 2A is exposed is prepared as one of two optical waveguide parts and the optical waveguide substrate 1 to the surface of which the waveguide core 1A is exposed is prepared as the other optical waveguide part and the optical waveguide device 2 is mounted on the optical waveguide substrate 1 with the electro-optic material layer 3 interposed therebetween, the mounting deviation compensation method for an optical waveguide part according to the present invention described above is not limited to this.

For example, the mounting deviation compensation method may be configured such that an optical waveguide substrate on a waveguide core (substrate side waveguide core) of which an upper cladding layer as an electro-optic material layer is provided is prepared as one of two optical waveguide parts and an optical waveguide device to the surface of which a waveguide core (device side waveguide core) is exposed is prepared as the other optical waveguide part and the optical waveguide device is mounted on the optical waveguide substrate.

Alternatively, the mounting deviation compensation method may be configured otherwise such that an optical waveguide device on a waveguide core (device side waveguide core) of which an upper cladding layer as an electro-optic material layer is provided is prepared as one of two optical waveguide parts and an optical waveguide substrate to the surface of which a waveguide core (substrate side waveguide core) is exposed is prepared as the other optical waveguide part and the optical waveguide device is mounted on the optical waveguide substrate.

Further, while, in the present embodiment described above, the optical waveguide device 2 is mounted on the optical waveguide substrate 1 (where the optical waveguide substrate 1 and the optical waveguide device 2 are assembled to each other), the present invention is not limited to this. For example, the present invention can be applied also to a case wherein an optical waveguide device and another optical waveguide device are assembled and another case wherein an optical waveguide substrate and another optical waveguide substrate are assembled.

Further, the present invention is not limited to the embodiment specifically described above, and variations and modifications can be made without departing from the scope of the present invention.

WORKING EXAMPLES

In the following, the present invention is described in more detail in connection with working examples with reference to FIGS. 4(A) to 4(F). However, the present invention shall not be limited by the working examples described below.

Working Example 1

In the present working example, as shown in FIGS. 4(A) to 4(F), two waveguide chips (optical waveguide parts) 11 (and 12) to the surface of which waveguide cores 11A (and 12A) were exposed were produced and assembled to each other with an electro-optic polymer (electro-optic material layer 13) interposed therebetween to produce an optical module 110. Then, the variation of the coupling efficiency (optical coupling efficiency) of the light power when an electric field was applied to the electro-optic polymer 13 through electrodes 14 was measured.

[Production of Waveguide Chips]

The waveguide chips 11 and 12 were produced in the following manner.

First, a lower cladding layer 11C (12C) (refractive index: 1.563, thickness: 20 μm) was formed from transparent epoxy V259 made by Nippon Steel Chemical on an entire face of a quartz glass substrate 11B (12B) as seen in FIGS. 4(A) to 4(D). A core film (refractive index: 1.567) was applied to the lower cladding layer 11C (12C), and a channel waveguide core 11A (12A) of a sectional size of 7 μm by 7 μm was formed by photolithography.

Further, a cladding material (refractive index: 1.563) was applied to the waveguide core 11A (12A) as seen in FIGS. 4(A) to 4(D) and then hardened (cured), whereafter it was polished until the surface of the waveguide core 11A (12A) appeared to flatten the surface. Two waveguide chips 11 and 12 were produced in this manner.

Figure 4A:
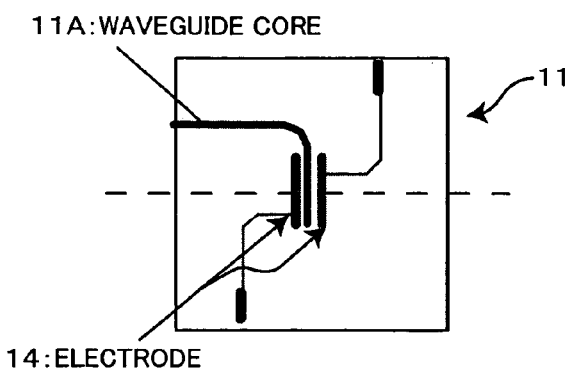
FIGS. 4(A) to 4(F) are schematic views showing a configuration of an optical module and illustrating a mounting deviation compensation method for an optical waveguide part according to a Working Example 1 of the present invention.
Figure 4C:
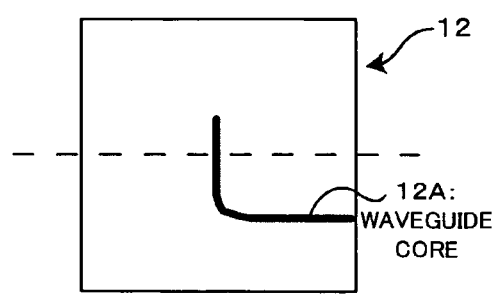
Figure 4B:
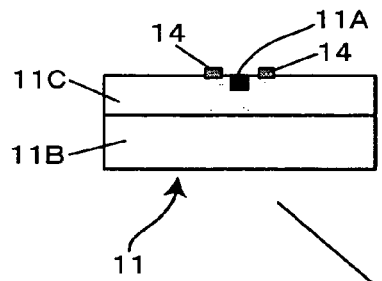
Figure 4D:
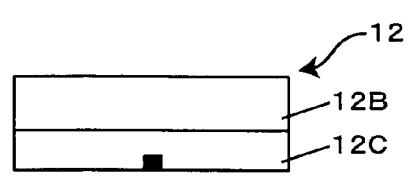

Further, a pair of electrodes 14 of 4 mm long made of tungsten were formed in parallel along the waveguide core 11A on the opposite sides of the waveguide core 11A on the surface of one of the waveguide chips, that is, the waveguide chip 11, as seen in FIGS. 4(A) and 4(B) by sputtering.

Then, electro-optic polymer 13 was applied to the thickness of approximately 5 μm to the surface of the waveguide chip 11 on which the electrodes 14 were formed as seen in FIG. 4 (F). Here, the electro-optic polymer 13 used was produced by adding 20% by weight organic dye CLD-1 to the transparent epoxy V259 mentioned hereinabove. It is to be noted that the electro-optic polymer 13 has a refractive index of 1.563 and an electro-optic coefficient of 30 pm/V.

Figure 4E:
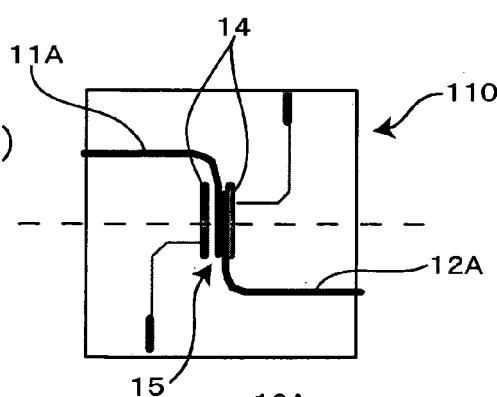
Figure 4F:
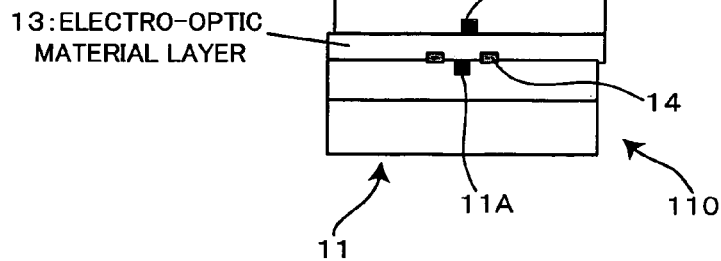

On the waveguide chip 11 to the surface of which the electro-optic polymer 13 was applied in this manner, the other waveguide chip 12 was mounted using a flip chip mounting apparatus such that the waveguide cores 11A and 12A were placed one on the other and extended in parallel to each other, and then, the electro-optic polymer 13 was thermally cured to produce an optical module 110. Here, the length (coupling length) of a parallel portion 15 along which the waveguide cores 11A and 12A are positioned closely to each other was set to 3 mm as seen in FIGS. 4(E) and 4(F).

[Evaluation]

A light beam of 3 mW having a wavelength of 1.55 μm was introduced into the channel waveguide core 11A of the waveguide chip 11 from a single mode fiber connected to the channel waveguide core 11A by a butt joint method, and the light power emitted from the single mode fiber connected to the channel waveguide core 12A of the other waveguide chip 12 was measured to determine the optical coupling efficiency to perform evaluation.

First, when the optical coupling efficiency was determined without applying an electric field to the electro-optic polymer 13 through the electrodes 14, it was found to be 73%. Thereafter, when a voltage was applied to the electrodes 14 to apply an electric field to the electro-optic polymer 13 to determine the optical coupling efficiency, the optical coupling efficiency rose to 82% at an electric field strength of 2 V/μm. However, when the electric field strength was raised to 4V/μm and further to 6 V/μm, the optical coupling efficiency dropped to 71% and 60%, respectively. From this, it was confirmed that the optical coupling efficiency can be adjusted and the mounting deviation can be compensated for by control of the applied voltage to the electrodes 14.

Working Example 2

Figure 5:
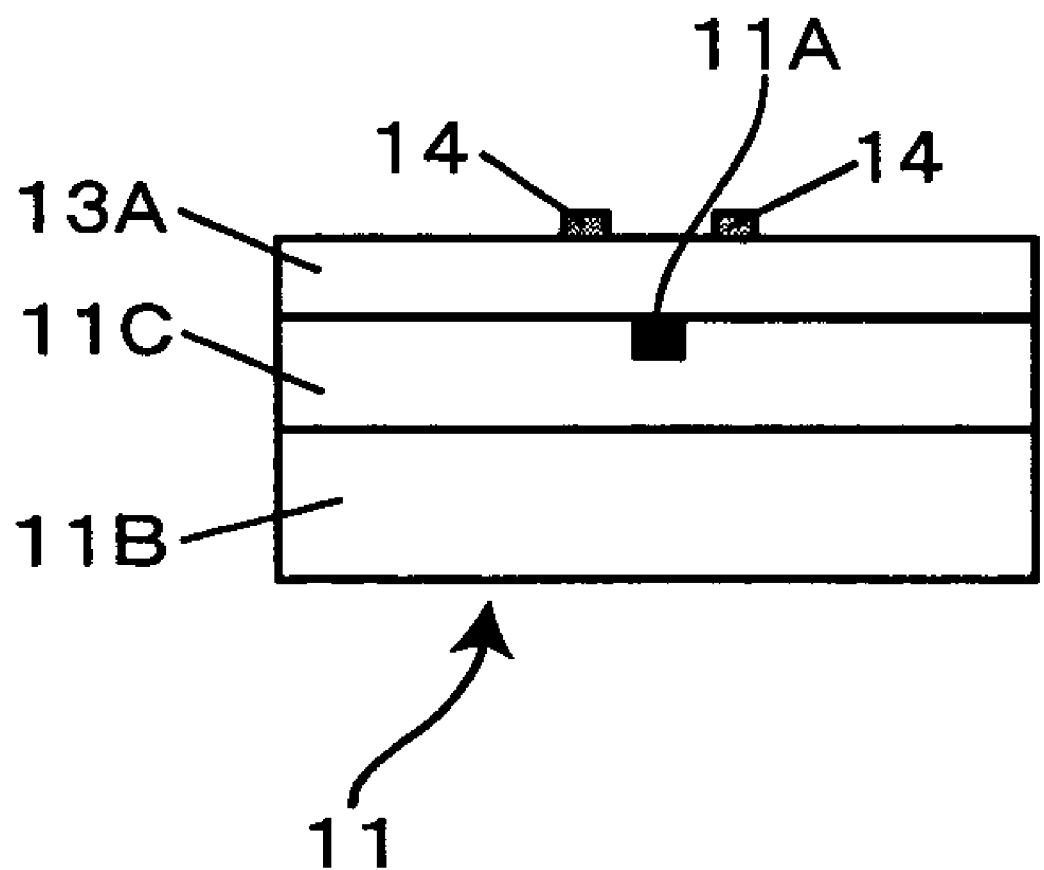
FIG. 5 is a schematic view showing a configuration of an optical module and illustrating a mounting deviation compensation method for an optical waveguide part according to a Working Example 2 of the present invention.
Figure 6:
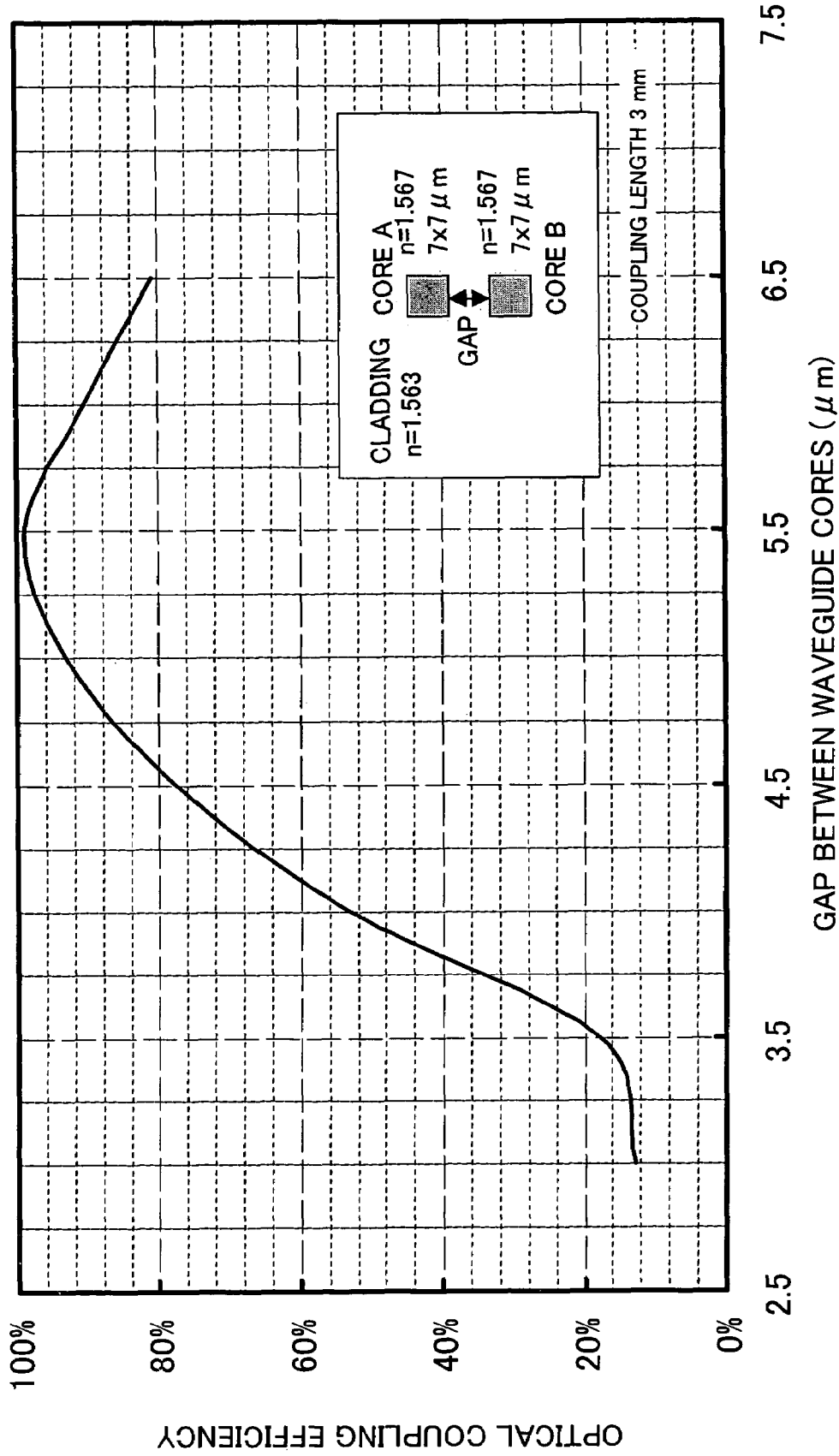
FIG. 6 is a graph illustrating a subject involved in a case wherein optical waveguide parts are assembled to produce an optical module.

In the present working example, similarly as in the Working Example 1 [refer to FIGS. 4(A) to 4(F)] described hereinabove, two waveguide chips (optical waveguide parts) 11 (and 12) to the surface of which the channel waveguide core 11A (12A) was exposed were produced, and an upper cladding layer 13A was formed from electro-optic polymer (electro-optic material layer) on the surface of one of the waveguide chips, that is, on the surface of the waveguide chip 11, as seen in FIG. 5, whereafter the waveguide chips 11 and 12 were adhered to each other to produce an optical module 110. Then, the variation of the coupling efficiency (optical coupling efficiency) of the light power when an electric field was applied to the electro-optic polymer as the upper cladding layer 13A was measured.

[Production of Waveguide Chips]

Two same waveguide chips 11 and 12 were fabricated similarly as in the Working Example 1 described hereinabove. It is to be noted, however, that an upper cladding layer 13A was formed from electro-optic polymer on the surface of the waveguide chip 11 to which the channel waveguide core 11A is exposed. Further, a pair of electrodes 14 of 4 mm long made of tungsten were formed in parallel along the waveguide core 11A on the opposite sides of the waveguide core 11A on the surface (here, cladding layer 13A) of one of the waveguide chips, that is, the waveguide chip 11, as seen in FIG. 5 by sputtering.

Then, matching oil (refractive index: 1.55) was dropped to the surface of one waveguide chip 11 on which the electrodes 14 ware formed, and the other waveguide chip 12 was mounted on the waveguide chip 11, to which the matching oil was dropped, using a flip chip mounting apparatus similarly as in the Working Example 1 described hereinabove to produce an optical module 110. Here, the pressure upon mounting of the waveguide chip was selected so that the matching oil remains a little as a thin film.

[Evaluation]

Evaluation of the optical module 110 was conducted similarly as in the Working Example 1 described above.

First, when the optical coupling efficiency was determined without applying an electric field to the electro-optic polymer as the upper cladding layer 13A through the electrodes 14, it was found to be 62%. Then, when a voltage was applied to the electrodes 14 to apply an electric field to the electro-optic polymer as the upper cladding layer 13A to determine the optical coupling efficiency, the optical coupling efficiency rose to 70% at an electric field strength of 2 V/μm. However, as the electric field was raised to 4 V/μm and further to 6 V/μm, the optical coupling efficiency dropped to 60% and 48%, respectively. From this, it was confirmed that the optical coupling efficiency can be adjusted and the mounting deviation can be compensated for by control of the applied voltage to the electrodes 14.

What is claimed is:

1. An optical module, comprising:
    a first optical waveguide part including a first waveguide core;
    a second optical waveguide part including a second waveguide core;
    an electro-optic material layer provided between said first and second waveguide cores and formed from an electro-optic material; and
    an electrode for applying an electric field to said electro-optic material layer so that the refractive index of said electro-optic material layer varies and the optical coupling coefficient between said first and second waveguide cores varies thereby an optical coupling efficiency is improved;
    wherein said first and second waveguide cores sandwich said electro-optic material layer in the vertical direction such that a light propagated through one of said first and second waveguide cores propagates to the other of said first and second waveguide cores via only said electro-optic material layer, and said electrode is comprised of a negative and a positive electrode, and said negative and positive electrode are provided on the opposite sides of a portion of said electro-optic material layer between said first and second waveguide cores so as to sandwich the portion of said electro-optic material layer in the horizontal direction.

2. The optical module as claimed in claim 1, wherein said first optical waveguide part is an optical waveguide substrate including an upper cladding layer as said electro-optic material layer on said first waveguide core while said second optical waveguide part is an optical waveguide device on the surface of which said second waveguide core is exposed, and said optical waveguide device is mounted on said optical waveguide substrate.

3. The optical module as claimed in claim 1, wherein said first optical waveguide part is an optical waveguide device including an upper cladding layer as said electro-optic material layer on said first waveguide core while said second optical waveguide part is an optical waveguide substrate on the surface of which said second waveguide core is exposed, and said optical waveguide device is mounted on said optical waveguide substrate.

4. The optical module as claimed in claim 1, wherein said first optical waveguide part is an optical waveguide device on the surface of which said first waveguide core is exposed while said second optical waveguide part is an optical waveguide substrate on the surface of which said second waveguide core is exposed, and said optical waveguide device is mounted on said optical waveguide substrate with said electro-optic material layer interposed therebetween.

5. The optical module as claimed in claim 1, wherein said electro-optic material layer is formed from electro-optic polymer.

6. The optical module as claimed in claim 1, further comprising a control section connected to said electrode for controlling the voltage to be applied to said electrode based on the distance between said first and second waveguide cores.

7. The optical module as claimed in claim 1, wherein said negative and positive electrode are formed in parallel along said first and second waveguide cores.

8. A mounting deviation compensation method for an optical waveguide part, comprising the steps of:
preparing a first optical waveguide part including a first waveguide core and a second optical waveguide part including a second waveguide core;
assembling said first and second optical waveguide parts with an electro-optic material layer sandwiched therebetween in the vertical direction such that a light propagated through one of said first and second waveguide cores propagates to the other of said first and second waveguide cores via only said electro-optic material layer; and
applying, where the distance between said first and second waveguide cores deviates, an electric field to said electro-optic material layer by a negative and a positive electrode, which are provided on the opposite sides of a portion of said electro-optic material layer between said first and second waveguide cores so as to sandwich the portion of said electro-optic material layer in the horizontal direction, to change the refraction index of said electro-optic material layer thereby to change the optical coupling coefficient between said first and second waveguide cores and to improve the optical coupling efficiency.

9. The mounting deviation compensation method for an optical waveguide part as claimed in claim 8, wherein an optical waveguide substrate including an upper cladding layer as said electro-optic material layer on said first waveguide core is prepared as said first optical waveguide part and an optical waveguide device on the surface of which said second waveguide core is exposed is prepared as said second optical waveguide part, and said optical waveguide device is mounted on said optical waveguide substrate.

10. The mounting deviation compensation method for an optical waveguide part as claimed in claim 8, wherein an optical waveguide device including an upper cladding layer as said electro-optic material layer on said first waveguide core is prepared as said first optical waveguide part and an optical waveguide substrate on the surface of which said second waveguide core is exposed is prepared as said second optical waveguide part, and said optical waveguide device is mounted on said optical waveguide substrate.

11. The mounting deviation compensation method for an optical waveguide part as claimed in claim 8, wherein an optical waveguide device on the surface of which said first waveguide core is exposed is prepared as said first optical waveguide part and an optical waveguide substrate on the surface of which said second waveguide core is exposed is prepared as said second optical waveguide part, and said optical waveguide device is mounted on said optical waveguide substrate with said electro-optic material layer interposed therebetween.

12. The mounting deviation compensation method for an optical waveguide part as claimed in claim 11, wherein said optical waveguide device is adhered to said optical waveguide substrate using electro-optic polymer as said electro-optic material layer.

13. The mounting deviation compensation method for an optical waveguide part as claimed in claim 8, wherein said negative and positive electrode are formed in parallel along said first and second waveguide cores.

14. A mounting deviation compensation method for an optical waveguide part, comprising the steps of:
preparing a first optical waveguide part including a first waveguide core and a second optical waveguide part including a second waveguide core;
assembling said first and second optical waveguide parts with an electro-optic material layer sandwiched therebetween in the vertical direction such that a light propagated through one of said first and second waveguide cores propagates to the other of said first and second waveguide cores via only said electro-optic material layer; and
applying, where a mounting deviation appears between said first and second waveguide cores, an electric field to said electro-optic material layer by a negative and a positive electrode, which are provided on the opposite sides of a portion of said electro-optic material layer between said first and second waveguide cores so as to sandwich the portion of said electro-optic material layer in the horizontal direction, to change the refraction index of said electro-optic material layer thereby to change the optical coupling coefficient between said first and second waveguide cores.

15. The mounting deviation compensation method for an optical waveguide part as claimed in claim 14, wherein an optical waveguide substrate including an upper cladding layer as said electro-optic material layer on said first waveguide core is prepared as said first optical waveguide part and an optical waveguide device on the surface of which said second waveguide core is exposed is prepared as said second optical waveguide part, and said optical waveguide device is mounted on said optical waveguide substrate.

16. The mounting deviation compensation method for an optical waveguide part as claimed in claim 14, wherein an optical waveguide device including an upper cladding layer as said electro-optic material layer on said first waveguide core is prepared as said first optical waveguide part and an optical waveguide substrate on the surface of which said second waveguide core is exposed is prepared as said second optical waveguide part, and said optical waveguide device is mounted on said optical waveguide substrate.

17. The mounting deviation compensation method for an optical waveguide part as claimed in claim 14, wherein an optical waveguide device on the surface of which said first waveguide core is exposed is prepared as said first optical waveguide part and an optical waveguide substrate on the surface of which said second waveguide core is exposed is prepared as said second optical waveguide part, and said optical waveguide device is mounted on said optical waveguide substrate with said electro-optic material layer interposed therebetween.

18. The mounting deviation compensation method for an optical waveguide part as claimed in claim 17, wherein said optical waveguide device is adhered to said optical waveguide substrate using electro-optic polymer as said electro-optic material layer.

19. The mounting deviation compensation method for an optical waveguide part as claimed in claim 14, wherein said negative and positive are formed in parallel along said first and second waveguide cores.

* * * * *